(12) United States Patent
Kunimatsu et al.

(10) Patent No.: US 7,720,384 B2
(45) Date of Patent: May 18, 2010

(54) WAVELENGTH DIVISION MULTIPLEXING APPARATUS

(75) Inventors: Kazuhiro Kunimatsu, Kawasaki (JP); Takeshi Ono, Kawasaki (JP); Toshiki Honda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 11/320,638

(22) Filed: Dec. 30, 2005

(65) Prior Publication Data

US 2006/0104640 A1     May 18, 2006

(30) Foreign Application Priority Data

Sep. 30, 2005   (JP) .............................. 2005-286660

(51) Int. Cl.
*H04J 14/02*   (2006.01)
(52) U.S. Cl. ........................................ 398/95; 398/196
(58) Field of Classification Search .................. 398/79, 398/82–84, 89, 93, 95, 196
See application file for complete search history.

(56) References Cited

U.S. PATENT DOCUMENTS 5,202,782 A * 4/1993 Nakamura et al. ............ 398/91
2002/0030867 A1 * 3/2002 Iannone et al. .............. 359/124
2002/0171884 A1 * 11/2002 Yang .......................... 359/110
2003/0228149 A1   12/2003 Kawakami et al.
2004/0208558 A1 * 10/2004 Roorda et al. ................. 398/57
2006/0120718 A1 * 6/2006 Natori ......................... 398/19
2006/0171712 A1 * 8/2006 Tanaka et al. ................. 398/45

FOREIGN PATENT DOCUMENTS

JP   2004-015328   1/2004
JP   2004-274113   9/2004

* cited by examiner

*Primary Examiner*—Nathan M Curs
(74) *Attorney, Agent, or Firm*—Fujitsu Patent Center

(57) ABSTRACT

A transponder in a wavelength division multiplexing apparatus detects a wavelength of a leak light (received light) having one of plural wavelengths multiplexed or divided by a WDM unit, the leak light having been received from the WDM unit when the transponder is connected to the WDM unit; determines a transmission wavelength which is a wavelength of a light to be transmitted to the WDM unit on the basis of the wavelength of the received light; and sets to convert the wavelength of the light to be transmitted to the WDM unit into the transmission wavelength, and transmit the converted light.

8 Claims, 10 Drawing Sheets ns apparatus

WAVELENGTH DIVISION MULTIPLEXING APPARATUS

BACKGROUND OF THE INVENTION

1. Field of the Invention

The present invention relates to a wavelength division multiplexing apparatus (WDM transmission apparatus) that multiplexes and divides plural signals in wavelength and then transmits the divided signals to thereby attain high-capacity transmission.

2. Description of the Related Art

As shown in FIG. 1, the WDM transmission apparatus includes a transponder unit that converts plural different signals into a specific wavelength, and a WDM unit (wavelength division multiplexing unit) that conducts wavelength multiplexing/division on the converted signal and optically amplifies the wavelength-multiplexed signal.

A wavelength that is subjected to wavelength multiplexing/division in the WDM unit is regulated by ITU-T G.694. The WDM unit generally multiplexes wavelengths that conform to wavelength grids which are regulated by ITU-T G.694. The WDM transmission apparatus of a high-capacity conducts wavelength multiplexing of 40 waves, 80 waves, or more. The transponder unit requires transponders as many as the multiplexed wavelengths. Accordingly, the more the number of multiplexed wavelengths increases, the more the scale of the WDM transmission apparatus is enlarged.

Upon starting (startup of) the WDM transmission apparatus, the transponders as many as the multiplexed wavelengths are connected to the WDM unit through optical fibers, respectively. At this time, wavelengths each corresponding to each wavelength received from a destination of the WDM selection need to be set to the transponders. In the existing circumstances, the connecting work is all conducted manually. The wavelengths of the transponders are also manually set by operator through, for example, a remote control from a central control station. Accordingly, in the start-up operation of the high-capacity WDM transmission apparatus, setting work related to a large number of wavelengths is required. Therefore, the wavelength setting work is very complicated, which leads to a high possibility of a setting error.

Also, in additionally providing (adding) a new wavelength for the WDM transmission apparatus that has already started the operation, the connection and setting work related to the new wavelength are required. In this case, the operator must give consideration to the wavelengths that have already been used to select unused wavelengths or to set the wavelength. In this situation, the operator must conduct the operation while checking a large number of items, which lead to a possibility of a setting error.

In order to eliminate the complication of the above-mentioned wavelength setting work, there has been already proposed a method of automatically setting the transmission wavelengths to the transponders. For example, Patent document 1 discloses "a wavelength-multiplexed light transmission system and an optical signal transmission control method". In the technique disclosed in Patent document 1, in consideration of the fact that a wavelength multiplexing portion of the WDM unit has a filter and allows a light of only a specific wavelength band to pass therethrough, photodetectors for detection of light intensity are disposed in front and back of the filter to sweep the transmission wavelengths of the transponders in sequence. With this structure, the light intensity can be detected when a wavelength that coincides with that of the destination is set to the transmission wavelength. In addition, a control unit in the WDM unit notifies a control unit in the transponder unit of light detection information to determine the transmission wavelength of the transponders as a set wavelength. In the technique disclosed in Patent document 1, there is required a structure in which information is transferred between the control unit in the WDM unit and the control unit in the transponder unit. Therefore, in a case where the WDM transmission device is structured by the WDM unit and the transponder unit which are different in vender, there is a fear that it is difficult to control the transfer between the WDM unit and the transponder unit. Also, in the technique disclosed in Patent document 1, the transmission wavelength of the transponder is swept to determine the set wavelength. Therefore, a long period of time may be required for the determination.

Also, Patent document 2 discloses "a wavelength-division multiplex system and a method of automatically setting conversion wavelengths in the system". The technique disclosed in Patent document 2 has not only a function of automatically setting the wavelength but also a function of preventing the misconnection of an optical fiber. The technique disclosed in Patent document 2 has a function of adding the wavelength information of itself by modulation of a main signal between the WDM unit and the transponder unit, with which the level monitor of a light that has passed through a specific filter of the WDM unit, and the demodulation and detection of the wavelength information which has been modulated after passing of the light are executed. As a result, it is possible to determine whether or not the wavelength to be set is accurately connected. The technique disclosed in Patent document 2 is required to provide each the transponder unit and the WDM unit with a modulation function for adding the wavelength information to the main signal.

As described above, in the techniques disclosed in Patent documents 1 and 2, both of the WDM unit and the transponder unit are improved (the function of automatically setting the wavelength is added) to realize the automatic wavelength setting.

[Patent document 1] JP 2004-274113 A
[Patent document 2] JP 2004-015328 A

SUMMARY OF THE INVENTION

An object of the present invention is to provide an improvement in a transponder unit which can automatically set a transmission wavelength.

In order to solve the above problems, the present invention is structured as follows.

That is, one aspect of the present invention provides a wavelength division multiplexing apparatus, including: a transponder unit and a wavelength division multiplexing unit connected with the transponder unit, in which:

the wavelength division multiplexing unit multiplexes in wavelength a plurality of lights having different wavelengths which are received from the transponder unit, sends the wavelength-multiplexed lights, receives the wavelength-multiplexed lights, divides the wavelength-multiplexed lights into a plurality of lights having different wavelengths, and transmits the divided lights to the transponder unit;

the transponder unit includes a plurality of transponders that are prepared in each wavelength multiplexed and divided by the wavelength division multiplexing unit, each transponder transmits and receives one of the plurality of lights with respect to the wavelength division multiplexing unit; and at least one of the plurality of transponders includes:

a detection unit detecting the wavelength of the received light having one of the different wavelengths which is received from the wavelength division multiplexing unit when the one transponder is connected to the wavelength division multiplexing unit;

a determination unit determining a transmission wavelength which is a wavelength of the light transmitted to the wavelength division multiplexing unit on the basis of the wavelength of the received light which is detected by the detection unit; and a setting control unit performing setting to convert the wavelength of the light to be transmitted to the wavelength division multiplexing unit into the transmission wavelength for transmission.

According to the present invention, each of the transponders detects the wavelength of a received light from the wavelength division multiplexing unit, and determines and sets a transmission wavelength on the basis of the detected received light. As a result, the transmission wavelength setting with respect to the transponders is automated to save the wavelength setting work. Also, a fear of the setting error due to manual work can be eliminated. Also, according to the present invention, the detection unit, the determination unit, and the setting control unit are provided with respect to each transponder of the existing wavelength division multiplexing apparatus, thereby making it possible to realize the automatic transmission wavelength setting.

According to the present invention, the detection unit includes a tunable filter that can change a pass wavelength and inputs a received light from the wavelength division multiplexing unit, a photodetector that detects the light that has passed through the tunable filter, and a control unit changing the pass wavelength according to a detection status of the photodetector, in which the detection unit detects the pass wavelength when the received light that has passed through the tunable filter is detected by the photodetector as a wavelength of the received light.

Also, according to the present invention, plural different wavelengths that can be used by the wavelength division multiplexing apparatus are regulated as a pass wavelength to be set in the tunable filter, there is further provided a storage unit storing all of the wavelengths that have been already used in the wavelength division multiplexing apparatus, in which all of the wavelengths that have been stored in the storage unit are precluded from the pass wavelengths to be set, and the pass wavelength that passes through the tunable filter is switched over to one of the pass wavelengths to be set according to the detection status of the photodetector.

Also, the present invention can be specified as an automatic transmission wavelength setting method in a wavelength division multiplexing apparatus having the same features as those in the above wavelength division multiplexing apparatus, a transponder having the same features as those in the transponder included in the above wavelength division multiplexing apparatus, and an automatic transmission wavelength setting method using the transponder.

According to the present invention, there can be provided an improvement of the transponder unit which can automatically set a transmission wavelength.

DETAILED DESCRIPTION OF THE PREFERRED EMBODIMENTS

Hereinafter, a description will be given of embodiments of the present invention with reference to the accompanying drawings. In the following description, structures of the embodiments are examples, and the present invention is not limited to the structures of the embodiments.

First Embodiment

Apparatus Structure

Figure 1:
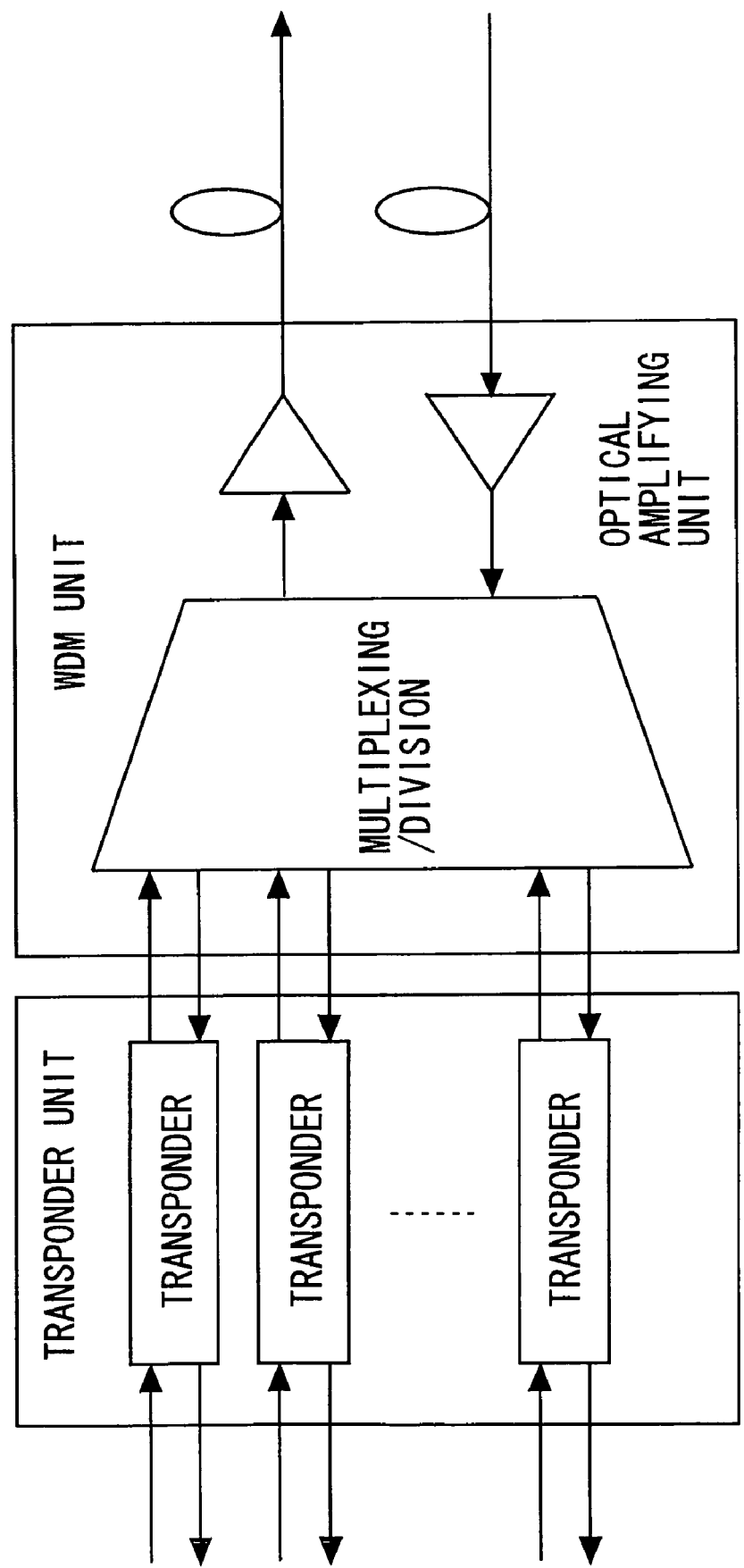
FIG. 1 is a structural diagram showing a conventional WDM transmission apparatus.
Figure 2:
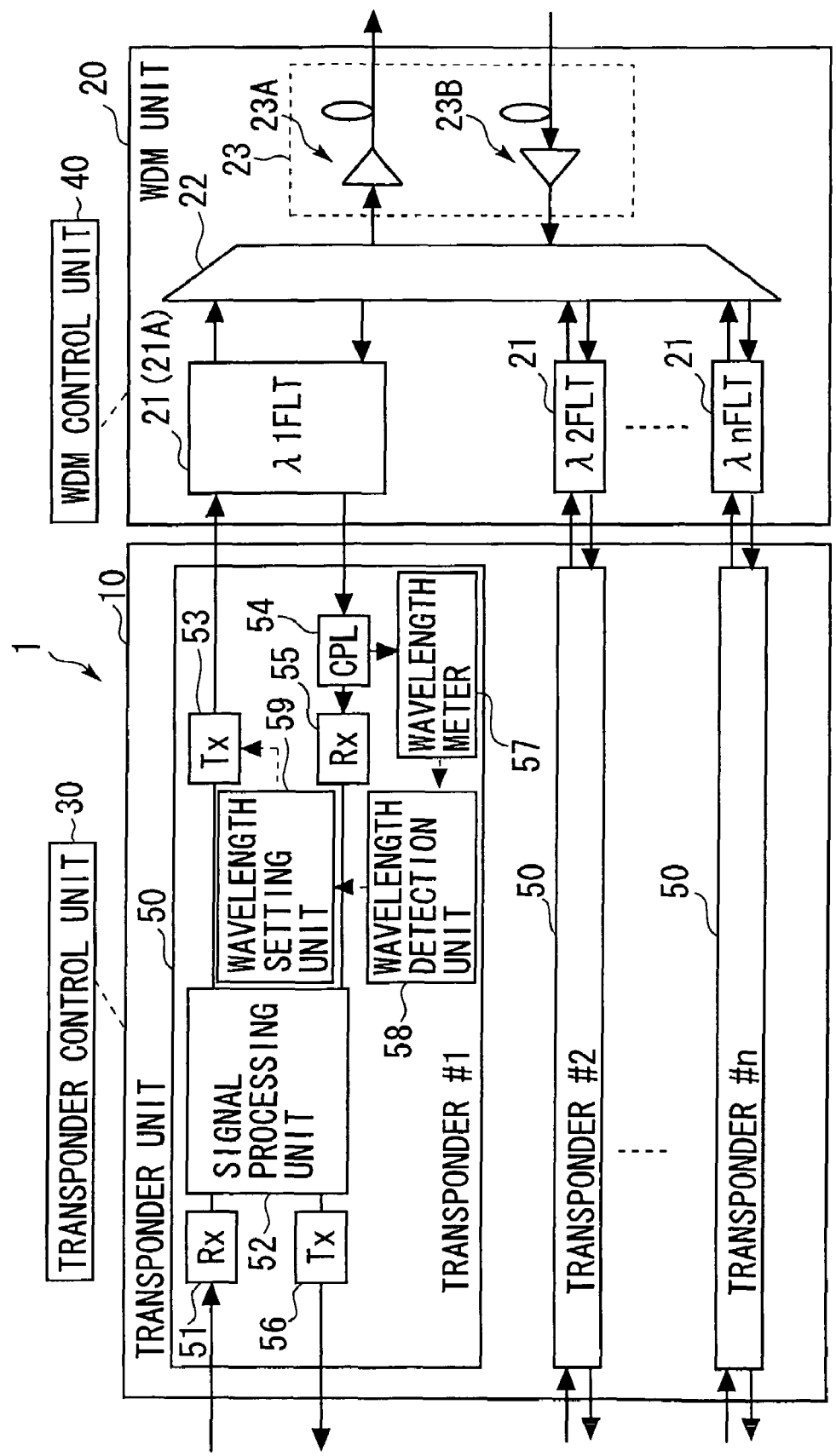
FIG. 2 is a diagram showing a structural example of a WDM transmission apparatus according to a first embodiment of the present invention.

FIG. 2 is a diagram showing a structural example of a WDM transmission apparatus (wavelength division multiplexing apparatus) according to a first embodiment of the present invention. Referring to FIG. 2, the WDM transmission apparatus 1 includes a transponder unit 10, a WDM unit (wavelength division multiplexing unit) 20 that is connected to the transponder unit 10 through an optical fiber, a transponder control unit 30 that controls the transponder unit 10, and a WDM control unit 40 that controls the WDM unit 20.

The transponder unit 10 transmits plural signal lights having wavelengths different from each other, which are dealt with by the WDM transmission apparatus 1 to the WDM unit 20. The WDM unit 20 multiplexes the wavelengths of the received plural signal lights, and then transmits the wavelength-multiplexed lights (multiplexed signal lights) toward a destination of the multiplexed signal lights (a portion connected to the WDM transmission apparatus 1). On the other hand, the WDM unit 20 receives the multiplexed signal lights resulting from multiplexing the plural signal lights each having a different wavelength. The WDM unit 20 amplifies the multiplexed signal light, divides the amplified signal light into plural signal lights each having a different wavelength, and transmits the divided signal lights to the transponder unit 10. The transponder unit 10 transmits the respective signal lights toward their destinations. Plural wavelengths corresponding to plural wavelength grids which are regulated by, for example, ITU-T G.694 can be applied as plural wavelengths (which can be subjected to multiplexing/division) which are dealt with by the WDM transmission device 1.

The transponder unit 10 can be equipped with transponders 50 (#1 to #n: n is a natural number) whose number is the same as that of wavelengths which are multiplexed and divided by the WDM transmission apparatus 1. Each of the transponders 50 converts received wavelength into one specific wavelength which is dealt with by the WDM transmission apparatus 1 in order to multiplex various signals (SONET/SDH, Ethernet (registered trademark), SAN, etc.).

The respective transponders 50 have the same structure. Each of the transponders 50 includes a receiving unit (Rx) 51 that receives the signal light (main signal), a signal processing unit 52 that processes the signal light received by the receiving unit 51, and a transmission unit (Tx) 53 that conducts wavelength conversion on the signal light outputted from the signal processing unit 52. The signal light outputted from the transmission unit 53 is inputted to the WDM unit 20.

Also, each of the transponders 50 includes an optical fiber coupler (CPL) 54 that branches the signal light (main signal) from the WDM unit 20, a receiving unit (Rx) 55 that receives the signal light from the CPL 54, and a transmission unit (Tx) 56 that transmits the signal light which has been outputted by the receiving unit 55 and has passed through the signal processing unit 52.

In addition, each of the transponders 50 includes a wavelength meter 57 that measures the wavelength of the signal light incident from the CPL 54 (light received from the WDM unit 20), a wavelength detection unit 58 that detects the wavelength of the received light, which has been measured by the wavelength meter 57, and a wavelength setting unit 59 that determines the wavelength detected by the wavelength detection unit 58 as a wavelength (transmission wavelength) to be obtained through the wavelength conversion by the transmission unit 53, and executes the setting control of the transmission wavelength.

On the other hand, the WDM unit 20 includes plural filters 21 each being provided for a corresponding transponder 50, a multiplexing/division unit 22 that is connected to the respective filters 21, and an optical amplification unit 23 that is connected to the multiplexing/division unit 22.

Each of the filters 21 is connected to a corresponding transponder 50 through an optical fiber. Each of the filters 21 is so structured as to allow a light having a specific wavelength $\lambda s$ (s=1, 2, . . . n−1, n: any one of $\lambda 1$ to $\lambda n$) to be transmitted and received with respect to the corresponding transponder 50 to pass therethrough. In other words, each of the filters 21 allows the predetermined wavelength $\lambda s$ among the light received from the corresponding transponder 50 to pass therethrough, and then transmits the wavelength $\lambda s$ to the multiplexing/division unit 22. On the other hand, each of the filters 21 allows the wavelength $\lambda s$ in the light signal that is inputted from the multiplexing/division unit 22 to pass therethrough, and then transmits the wavelength $\lambda s$ to the CPL 54 of the corresponding transponder 50. In this way, each of the transponders 50 and the corresponding filter 21 form a pair to transmit and receive the light having the predetermined wavelength $\lambda s$ (one of plural lights having the wavelengths different from each other).

The multiplexing/division unit 22 has a multiplexing unit that multiplexes the respective wavelengths which have passed through the respective filters 21, and a division unit that divides the multiplexed wavelength (multiplex optical signal) inputted from the optical amplification unit 23 into plural wavelengths. The optical amplification unit 23 includes an optical amplifier 23A that amplifies the signal light (multiplex signal light) of total wavelength bands which are multiplexed in wavelength by the multiplexing/division unit 22, and an optical amplifier 23B that amplifies the total wavelength bands of the multiplex signal light received from a portion connected to the WDM transmission apparatus 1. A signal light that has been amplified by the optical amplifier 23A is transmitted toward the portion connected to the WDM transmission apparatus 1. A signal light that has been amplified by the optical amplifier 23B is inputted to the multiplexing/division unit 22.

In the first embodiment, the implementing conditions are that the WDM unit 20 has been already operated, and the transmission and reception between the WDM unit 20 and the transponder unit 10 as a pair of the transponder 50 and the filter 21. Hereinafter, a case in which a wavelength is added to the WDM transmission apparatus 1 of the operating state will be described.

Wavelength Detection and Setting

Figure 3:
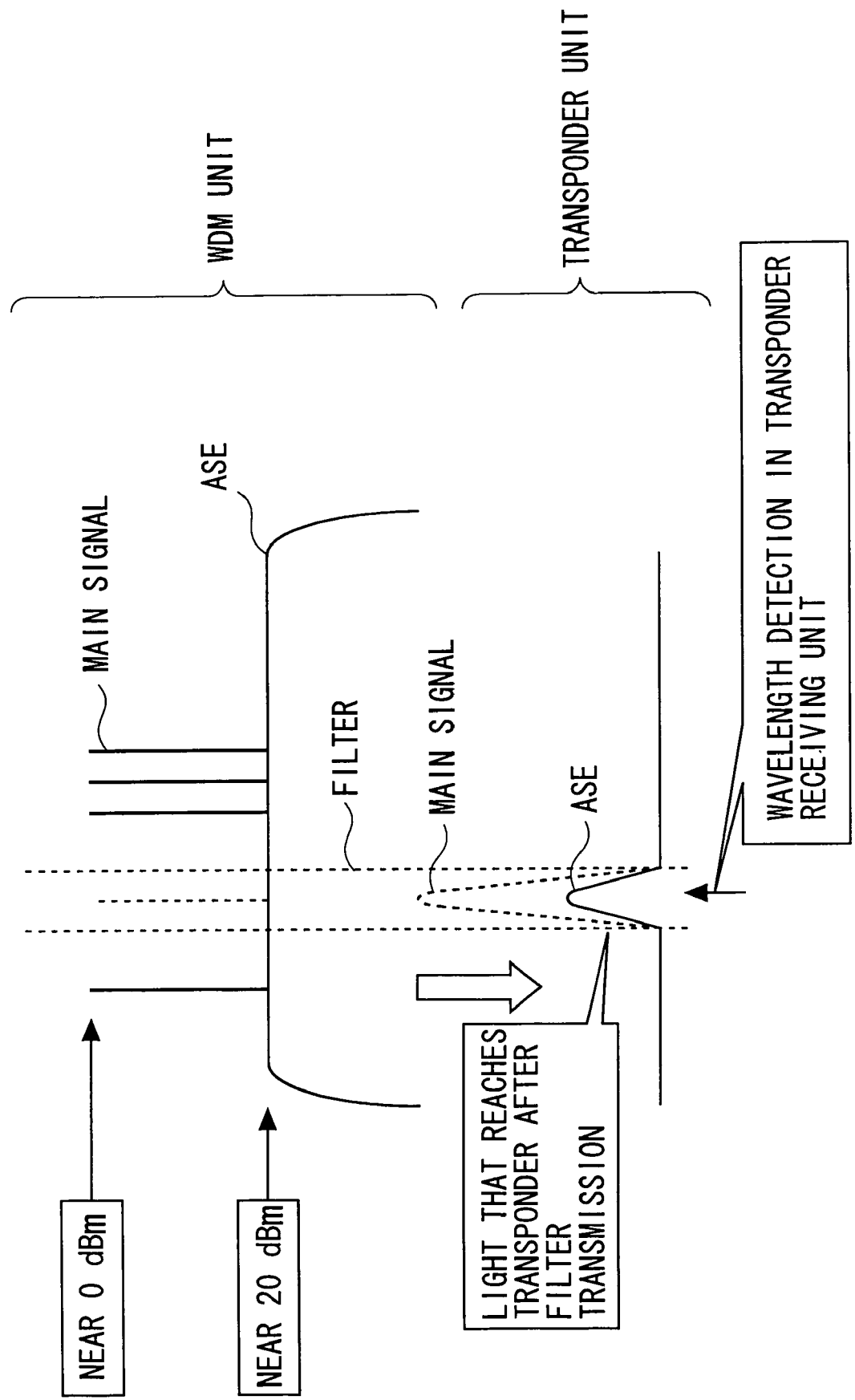
FIG. 3 is an explanatory diagram showing an ASE leak light (light received from WDM unit) which passes through a WDM unit.

In the first embodiment, the transponder 50 detects the wavelength of the light (received light) which is inputted from the WDM unit 20, determines the detected wavelength as the transmission wavelength, and sets the transmission wavelength in the transmission unit 53. FIG. 3 is an explanatory diagram showing the received light from the WDM unit 20, which is detected by the transponder 50.

When the WDM unit 20 starts to be operated, the optical amplification is applied to the received multiplex signal light by the optical amplifier 23B in the WDM unit 20. In the operating state, as shown in FIG. 3, even in the unused wavelength in the WDM transmission apparatus 1, a noise component of the optical amplifier which is called "ASE (amplified spontaneous emission) light" is amplified to an optical power of some degree in the total wavelength band in the optical amplifier 23B of the WDM unit 20.

In the wavelength division direction (the WDM unit 20 to the transponder unit 10) of the WDM unit 20, the ASE light is divided into respective wavelengths in the multiplexing/division unit 22, and the respective wavelengths pass through the filter 21, and reach the transponder 50 as an optical level in the respective wavelengths (wavelength band) corresponding to the wavelengths passed through the filter 21, as shown in FIG. 3. The present invention utilizes such a leak light (ASE) incident to the transponder 50 from the WDM unit 20, detects the wavelength of the leak light by the transponder 50, and the uses the detected wavelength as the transmission wavelength to be set in the own apparatus.

For example, it is assumed that the wavelength setting (wavelength addition) with respect to the transponder 50 (#1) shown in FIG. 2 is conducted. In the WDM unit 20, the multiplex signal light that has been amplified by the optical amplifier 23B is divided by the multiplexing/division unit 22, and then inputted to the respective filters 21. In this example, a filter 21A corresponding to the transponder 50 (#1) allows only a light having a given wavelength band centered on a given wavelength $\lambda 1$ to pass therethrough. Accordingly, the light (ASE) having the wavelength band that centers on the wavelength $\lambda 1$ is outputted from the filter 21A as the leak light.

The connection worker accurately connects $\lambda 1$ (filter 21A) of the WDM unit 20 to an unused transponder (transponder 50 (#1)) of the transponder unit 10 by an optical fiber. As a result, the light having the wavelength band centered around the wavelength $\lambda 1$ is inputted to the receiving unit 55 (main signal receiving unit) of the transponder 50 (#1).

In this example, the CPL 54 is inserted between the receiving unit 55 and the filter 21A. Therefore, a part of the light received from the filter 21A is branched by the CPL 54 and inputted to the wavelength meter 57 for wavelength detection. The wavelength meter 57 measures the wavelength of the inputted light.

Figure 4:
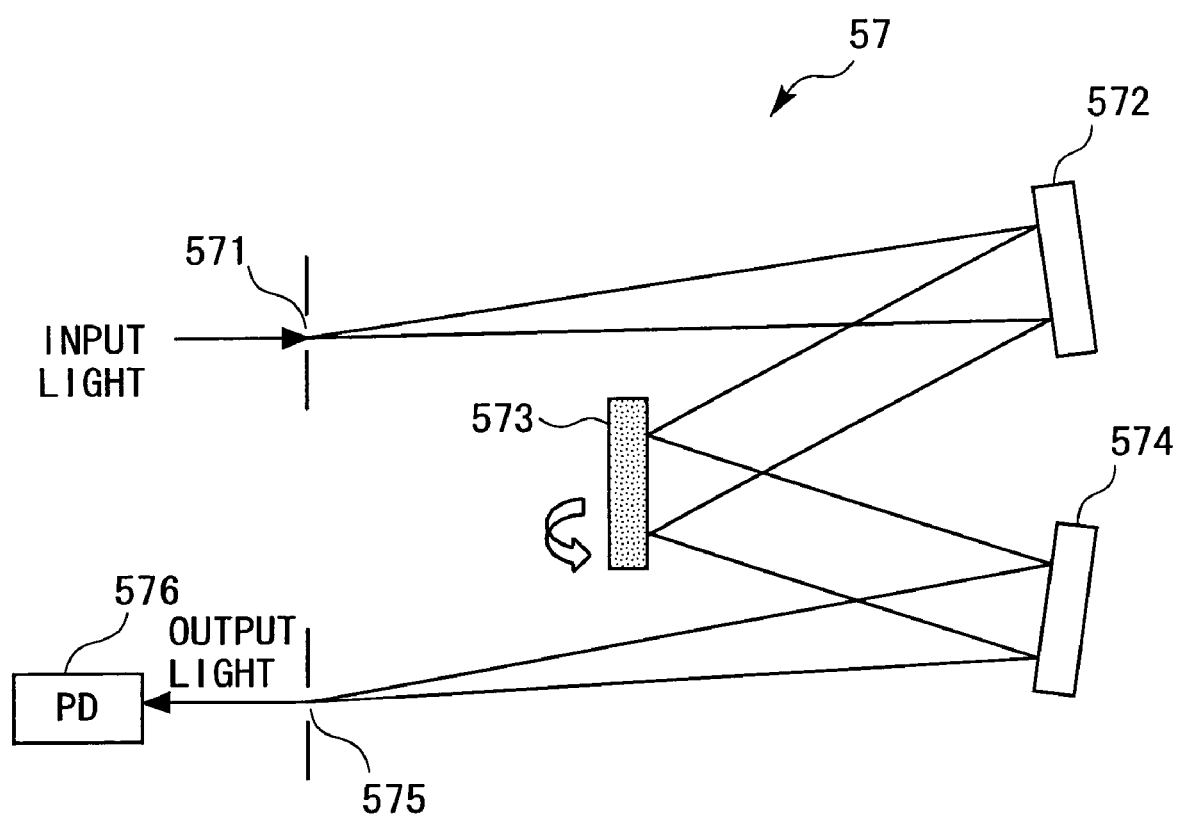
FIG. 4 is a diagram showing a structural example of a wavelength meter shown in FIG. 2.

FIG. 4 is a diagram showing a structural example of the wavelength meter 57. In FIG. 4, the wavelength meter 57 includes a first slit 571 through which an input light (received light) from the CPL 54 passes, a first mirror 572 that reflects the light that has passed through the first slit 571, a grating (diffraction grating) 573 that diffracts the light reflected by the first mirror 572 due to reflection, a second mirror 574 that reflects the light diffracted by the grating 573, a second slit 575 through which the light reflected by the second mirror 574 passes, and a photodetector (e.g., photo diode: PD) 576 that detects the light that has passed through the second slit 575.

The grating 573 is a light dispersion element having a large number of slits which are arranged at regular intervals. The grating 573 rotates due to an actuator (not shown), and changes its own rotation angle (reflection angle). When the grating 573 rotates, a light diffraction direction changes, and the wavelength of a light reflected by the grating 573 is changed. As a result, a light having the wavelength corresponding to the rotation angle of the grating 573 is emitted from the second slit 575. Accordingly, the wavelength of the output light that has been detected by the PD 576 can be obtained from the rotation angle of the grating 573 at the time when the output light is detected by the PD 576.

The wavelength meter 57 drives the actuator in response to, for example, a notice (request command) from the transponder control unit 30 to rotate the grating 573. In this situation, when the wavelength of the input light coincides with the rotation angle of the grating 573, the output light is emitted from the second slit 575 and detected by the PD 576.

Then, the wavelength meter 57 supplies, as the wavelength (wavelength information) of the input light (light received from the WDM unit 20), a wavelength corresponding to the rotation angle of the grating 573 at the time when the output light is detected by the PD 576 on the basis of, for example, data indicative of a relationship between the rotation angle of the grating 573 and the wavelength of the output light (for example, data stored in a memory device (not shown)).

For example, the wavelength meter 57 can be so structured as to have, data indicative of a relationship between the rotation angle and the wavelength, rotation angle data of the grating 573 corresponding to the wavelengths λs of the respective wavelength grids used in the WDM transmission apparatus 1, and switch over the rotation angle of the grating 573 so that the lights of the respective wavelengths λs are detected by the PD 576.

Returning to FIG. 2, the wavelength detection unit 58 has information indicative of plural wavelength grids used in the WDM transmission apparatus 1 for determining the wavelength. The information on the wavelength grid is stored, for example, in the memory device (not shown). Appropriate wavelength widths (center wavelength±a) can be defined from the center wavelengths of the respective wavelength grids as the information on the wavelength grids.

When receiving the wavelength information from the wavelength meter 57, the wavelength detection unit 58 determines which wavelength width range the wavelength indicated by the wavelength information falls into. That is, the wavelength detection unit 58 compares the wavelength information from the wavelength meter 57 with the wavelength grid information (ranges of the respective wavelength grids), and determines to which wavelength grid the wavelength that is presently received from the WDM unit 20 corresponds. After determining the wavelength grid to which the wavelength that has been detected by the wavelength meter 57 belongs, the wavelength detection unit 58 transmits the center wavelength of the wavelength grid thus determined to the wavelength setting unit 59 as the wavelength information to be set as the transmission wavelength λ1.

Upon receiving the wavelength information from the wavelength detection unit 58, the wavelength setting unit 59 controls to set the wavelength specified by the wavelength information in the transmission unit 53 of the main signal as the transmission wavelength λ1 at the WDM side of the transponder 50 (#1). As a result, the transmission unit 53 converts the signal light from the signal processing unit 52 into a signal light having the transmission wavelength λ1 and then transmits the converted signal light to the WDM unit 20.

In the above structure, the CPL 54, the wavelength meter 57, the wavelength detection unit 58, and the wavelength setting unit 59 are novel structures according to the present invention. The wavelength detection unit 58 and the wavelength setting unit 59 can be realized by, for example, a hardware logic circuit. Alternatively, the wavelength detection unit 58 and the wavelength setting unit 59 are made up of a processor such as a CPU, a memory device, and an input/output interface, and can be structured such that the processor executes a program stored in the memory device to realize the above functions.

Operation Example

Figure 5:
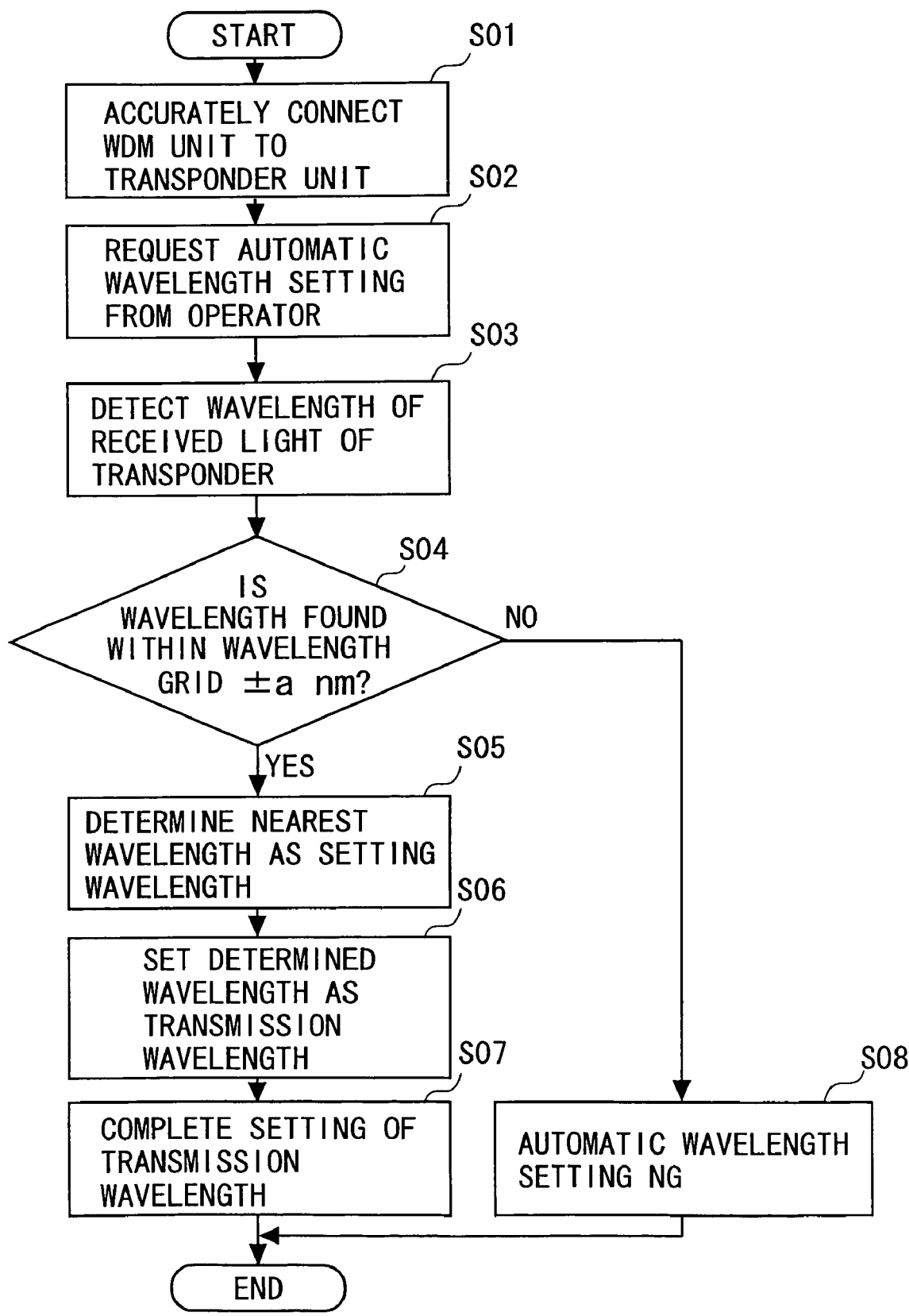
FIG. 5 is a diagram showing an automatic wavelength setting sequence according to the first embodiment.

FIG. 5 is a diagram showing an automatic wavelength setting sequence which is implemented by the WDM transmission apparatus 1 in the first embodiment. An automatic wavelength setting process (automatic wavelength setting method) will be described with reference to FIG. 5. Referring to FIG. 5, the WDM unit 20 (filter 21) and the transponder unit 10 (transponder 50 involved in the wavelength setting) are first accurately connected to each other by an optical fiber with the transmission side (transponder to WDM unit) and the receiving side (WDM unit to transponder) forming a pair (Step S01). In this situation, at least one transponder 50 is to be connected. In this operation example, for example, the transponder 50 (#1) is to be connected.

Thereafter, an operator inputs an automatic wavelength setting request command to the transponder control unit 30 (Step S02). The request command can be individually given to each of the transponders 50 to which a wavelength is to be set. Alternatively, it is possible to concurrently give the request commands to the plural transponders 50 to each of which a wavelength is to be set.

For example, an automatic wavelength setting request command including identification information of the transponder to which a wavelength is to be set is inputted to the transponder control unit 30. Then, the transponder control unit 30 notifies only the transponder 50 having the identification information included in the request command of the automatic wavelength setting request. In this example, the request command is supplied to only the transponder 50 (#1).

Each of the transponders 50 (transponder 50 (#1) in this example) that have received the request command (automatic wavelength setting request) conducts the following operation. That is, in the transponder 50 (#1), the wavelength meter 57 reads the wavelength of the received light that has received from the WDM unit 20, and transmits the wavelength information to the wavelength detection unit 58 (Step S03).

Subsequently, the wavelength detection unit 58 determines a range (wavelength grid) of the wavelength width to which the wavelength information is applicable, on the basis of the wavelength grid information. That is, the wavelength detection unit 58 retrieves the wavelength width of the center wavelength±a [nm] to which the wavelength specified by the wavelength information is applicable (the center wavelength of the wavelength grid nearest to the wavelength specified by the wavelength information) (Step S04).

In this situation, in the case of retrieving the corresponding wavelength width (wavelength grid) (YES in S04), the center wavelength of the wavelength grid thus retrieved is determined as the transmission wavelength λ1, and transmitted to the wavelength setting unit 59 as the wavelength information (Step S05). On the contrary, in the case of retrieving no corresponding wavelength (NO in S04), it is determined that the automatic wavelength setting is disabled (NG) (Step S08), and the sequence shown in FIG. 5 is finished.

In the case where the wavelength information is received from the wavelength detection unit 58, the wavelength setting unit 59 controls to set the wavelength specified by the wavelength information as the transmission wavelength λ1 (Step S06). That is, the wavelength setting unit 59 sets the transmission wavelength λ1 in the transmission unit 53 so that the transmission unit 53 outputs the signal light having the transmission wavelength λ1 by wavelength conversion. Upon completion of the transmission wavelength setting, it is determined that the automatic wavelength setting has been normally completed (Step S07), and the automatic wavelength setting sequence is finished. Thereafter, the transponder 50 (#1) become operative. That is, the transponder 50 (#1) converts the signal light that has been received by the receiving unit 51 into the transmission wavelength λ1 that has been set by the transmission unit 53, and then transmits the converted signal light to the WDM unit 20.

Effects of the First Embodiment

According to the first embodiment (WDM transmission apparatus 1), the transponder 50 includes the detection unit (wavelength meter 57) for detecting the wavelength of the received light from the WDM unit 20, the determination unit (wavelength detection unit 58) for determining the transmission wavelength of the light to be transmitted from the transponder 50 to the WDM unit 20, on the basis of the detected wavelength, and the setting control unit (wavelength setting unit 59) that conducts the setting control of the determined transmission wavelength.

According to the first embodiment, the connection worker connects the transponder 50 to the WDM unit 20, and when the operator inputs the request command for automatic wavelength setting, the transmission wavelength of the transponder 50 is automatically set. That is, with the input of the request command as a trigger, the wavelength of the received light from the WDM unit 20 is detected, and the transmission wavelength is determined and set on the basis of the wavelength of the detected received light. In this situation, the wavelength of the received light can be also determined as the transmission wavelength. As a result, the transmission wavelength setting work of the transponder 50 can be automated, to thereby simplify the setting work and save the work.

Also, an improvement for conducting the automatic wavelength setting is conducted by only the transponder unit 10 (there is no necessity of changing the WDM unit 20). Therefore, it is unnecessary to conduct a specific exchange between the transponder unit 10 and the WDM unit 20. Accordingly, there are such advantages that the structure of the WDM transmission apparatus 1 can be simplified, and the free degree of the combination of the transponder unit and the WDM unit is ensured.

In other words, the first embodiment has the following advantages.

(1) It is possible to automatically conduct the setting work of the transmission wavelength of the transponder at the time of starting the WDM transmission apparatus and at the time of increasing the wavelength. Therefore, the complication of the work is reduced, and a fear of setting error made by the operator can be eliminated.

(2) In the first embodiment, only the transponder unit is controlled as compared with the conventional art. Therefore, it is unnecessary to interlock (associate) the control unit in the WDM unit with the control unit in the transponder unit. Therefore, even a WDM unit that is provided by a different vender can apply the transponder unit according to the first embodiment.

(3) According to the first embodiment, plural transponders to each of which the wavelength is to be set conduct independently the automatic wavelength setting process by one input of the automatic wavelength setting request command. As a result, a period of time required for the wavelength setting can be reduced. This is a more effective advantage as the number of wavelengths to be set is larger.

(4) In addition, the wavelength setting of the transponder reads the received wavelength information and sets the read wavelength information as the transmission wavelength. Therefore, the setting period of time is shorter than that in other systems. Accordingly, the start-up time of the WDM transmission apparatus can be reduced.

Modified Example

In the first embodiment, the description is given of the structure in which each of the transponders 50 has an automatic wavelength setting unit including the CPL 54, the wavelength meter 57, the wavelength detection unit 58, and the wavelength setting unit 59. The structure may be replaced by a structure in which only at least one transponder to which an unused wavelength may be set has the automatic wavelength setting unit. That is, any number of transponders having the automatic wavelength setting unit can be installed in the transponder unit 10. The same is applied to second and third embodiments which will be described later.

Second Embodiment

Subsequently, a description will be given of a wavelength division multiplexing apparatus (WDM transmission apparatus) according to a second embodiment of the present invention. The second embodiment includes the similarity with the first embodiment, and therefore differences will be mainly described, and the description of the similarity will be omitted.

Device Structure

Figure 6:
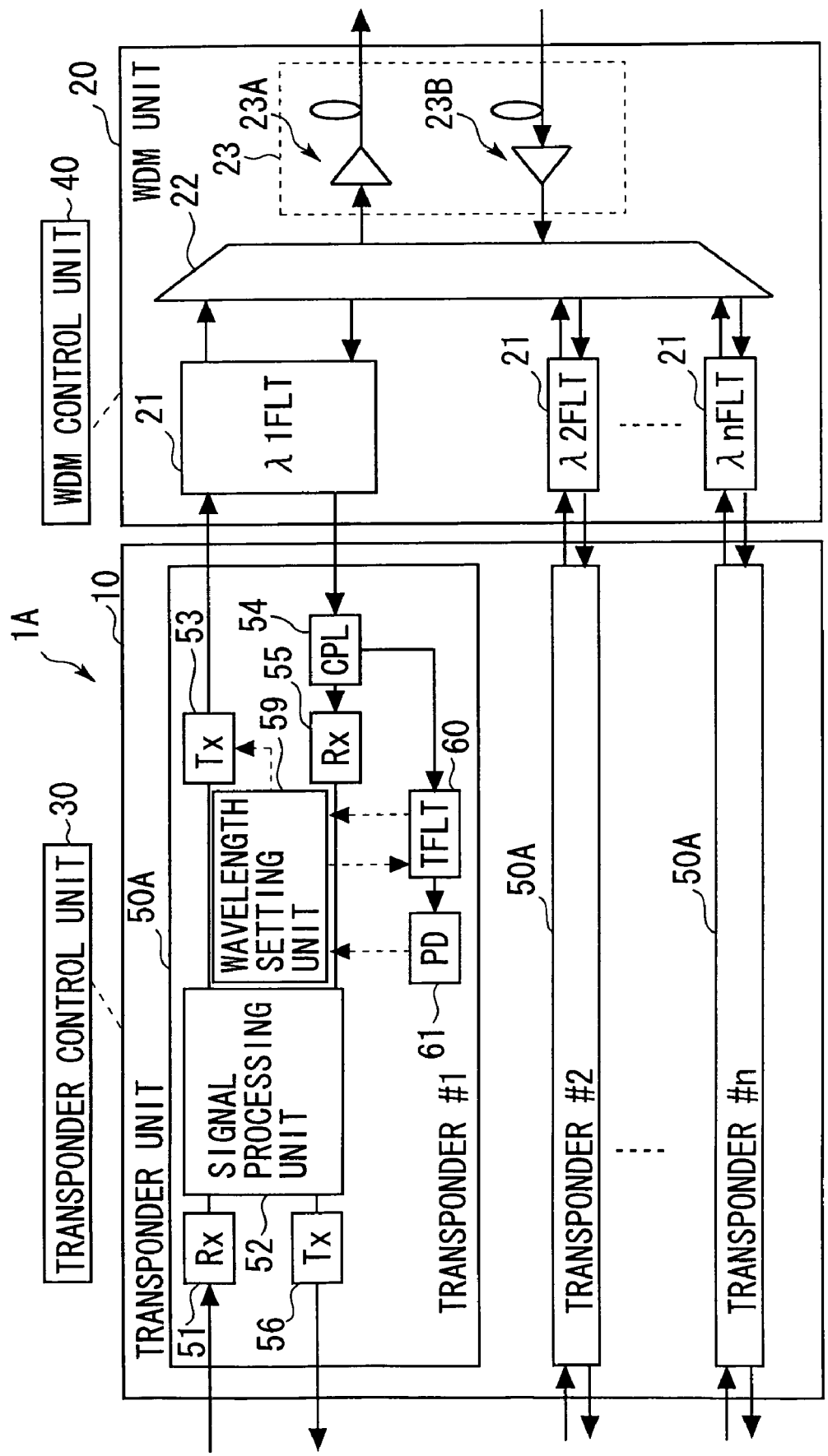
FIG. 6 is a diagram showing a structural example of a WDM transmission apparatus according to a second embodiment of the present invention.

FIG. 6 is a diagram showing a structural example of a WDM transmission apparatus according to the second embodiment of the present invention. That is, the transponder unit 10 according to the second embodiment has plural transponders 50A. Each of the transponders 50A includes an optical tunable filter (TFLT) 60, a PD 61, and a wavelength control unit 62 instead of the wavelength meter 57, the wavelength detection unit 58, and the wavelength setting unit 59 which are shown in FIG. 2. Except for the above structure, the WDM transmission apparatus 1A has the same structure as that of the WDM transmission apparatus 1. In FIG. 6, the same structural elements as those in the WDM transmission apparatus 1 are denoted by identical symbols.

Figure 7A:
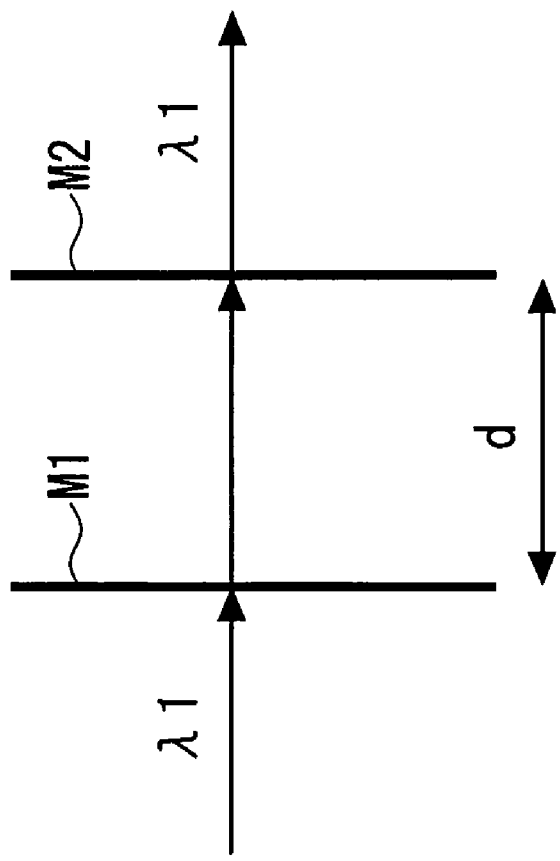
FIGS. 7A and 7B are diagrams showing a principle of an etalon filter that can be applied to an optical tunable filter shown in FIG. 6.
Figure 7B:
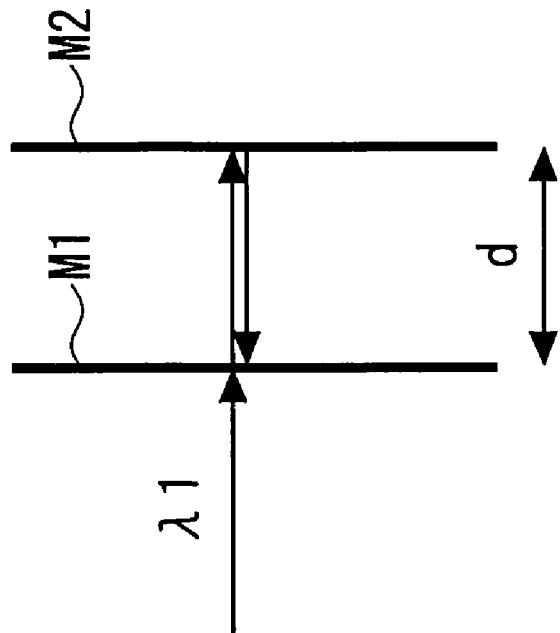

The TFLT 60 can be formed of, for example, an etalon filter based on the principle of a Fabry-Perot interferometer. FIGS. 7A and 7B are diagrams showing a principle of wavelength measurement by the etalon filter. As shown in FIGS. 7A and 7B, the etalon filter includes two plane mirrors M1 and M2 which face each other in parallel and are low in transmission factor.

When a collimated light beam is inputted to the plane mirrors M1 and M2, multiple interference allows only a light having a specific wavelength to pass through (transmit) the plane mirrors M1 and M2. The pass wavelength can be controlled, and when it is assumed that the integral multiple of ½ of the wavelength λ1 of the incident light is an interval d between the plane mirror M1 and the plane mirror M2, the wavelength λ1 of the incident light is totally transmitted by the plane mirrors M1 and M2. That is, as shown in FIG. 7A, in the case where the interval d is the integral multiple of ½ of the wavelength λ1 of the incident light, when the incident light λ1 is inputted to, for example, the plane mirror M1, the transmission light (passing light) λ1 is outputted from the plane mirror M2.

On the contrary, when the interval d is different from the integral multiple of ½ of the incident light wavelength, the incident light is totally reflected by the plane mirror at the output side, and the transmission light is not outputted. That is, as shown in FIG. 7B, in the case where the interval d is different from the integral multiple of ½ of the incident light wavelength, the incident light λ1 is inputted to, for example, the plane mirror M1, the incident light λ1 is totally reflected by the plane mirror M2, and the transmission light is not outputted from the plane mirror M2.

With the above principle, the etalon filter adjusts the interval d between the plane mirrors M1 and M2, thereby making it possible to pass a desired wavelength through the etalon filter. The TFLT 60 has the above etalon filter as well as an actuator (not shown) which adjusts the interval d between the plane mirrors M1 and M2. The TFLT 60 is designed in such a manner that the incident light from the CPL 54 is inputted to the plane mirror M1, and with the adjustment of the interval d by the actuator, the incident light from the CPL 54 transmits the plane mirror M2 and is outputted from the plane mirror M2. That is, the TFLT 60 can change the pass wavelength by the adjustment of the interval d. Accordingly, various pass wavelengths can be set with respect to the TFLT 60. The adjustment of the interval d is conducted by controlling the actuator through the wavelength control unit 62. The TFLT 60 inputs a signal indicative of the interval d (positional information of the plane mirror) to the wavelength control unit 62.

The PD 61 shown in FIG. 6 detects the light level of the output light (transmission light) from the plane mirror M2, that is, the passing light (pass wavelength band) of the TFLT 60. When the passing light is detected by the PD 61, a signal indicative of the detection is inputted to the wavelength control unit 62 from the PD 61.

The wavelength control unit 62 has data related to the relationship between the interval d and the wavelength λ (pass wavelength band of TFLT 60) (for example, data is stored in the memory device), and a predetermined pass wavelength can be set in the TFLT 60 with the adjustment of the interval d. Also, the wavelength control unit 62 can receive a signal (notification) indicative of the detection of a transmission light from the PD 61.

In the case where the wavelength of the incident light (received light) to the TFLT 60 coincides with the pass wavelength (set in the TFLT 60), the received light passes through the TFLT 60 and reaches the PD 61. In this situation, the PD 61 notifies the wavelength control unit 62 of the detection of the received light. The wavelength control unit 62 can obtain the wavelength of the received light from the interval d (pass wavelength) when the received light (light level) is detected by the PD 61.

The wavelength control unit 62 has, for example, data of the intervals d corresponding to the respective wavelength grids λs (s=1, 2, ..., n−1, n: n is a natural number) of ITU-T G.694, as data indicative of the relationship between the pass wavelength and the interval d. In this case, the wavelength control unit 62 can set the pass wavelengths corresponding to the respective wavelength grids (that is, a filter region of the TFLT 60) in the TFLT 60 with the adjustment of the interval d. For example, the wavelength control unit 62 can switch over the pass wavelength in such a given order of the wavelengths as λ1, λ2, ..., λn. The pass wavelength switches over according to the detection status of the PD 61. That is, in the case where the light level is not detected by the PD 61 in a certain pass wavelength under the state where the received light is inputted to the TFLT 60, the pass wavelength switches over (changes) to a different pass wavelength.

The wavelength control unit 62 obtains the wavelength of the received light, and then determines the obtained wavelength as a transmission wavelength. For example, the wavelength control unit 62 can retrieve the center wavelength of the wavelength grid nearest to the obtained wavelength, and can determine the retrieved center wavelength as the transmission wavelength of the transponder 50A as in the first embodiment.

In addition, the wavelength control unit 62 controls the setting of the transmission wavelength thus determined. For example, the wavelength control unit 62 executes the wavelength setting with respect to the transmission unit 53 so that the transmission unit 53 of the main signal generates the optical signal having the determined transmission wavelength by wavelength conversion.

In the above structure, the automatic wavelength setting unit made up of the CPL 54, the TFLT 60, the PD 61, and the wavelength control unit 62 is a novel structure of the present invention. The wavelength control unit 62 can be realized, for example, by a hardware logic circuit. Alternatively, the wavelength control unit 62 is made up of a processor such as a CPU, a memory device and an input/output interface, and can be structured such that the processor executes a program stored in the memory device to realize the above functions.

Operation Example

Figure 8:
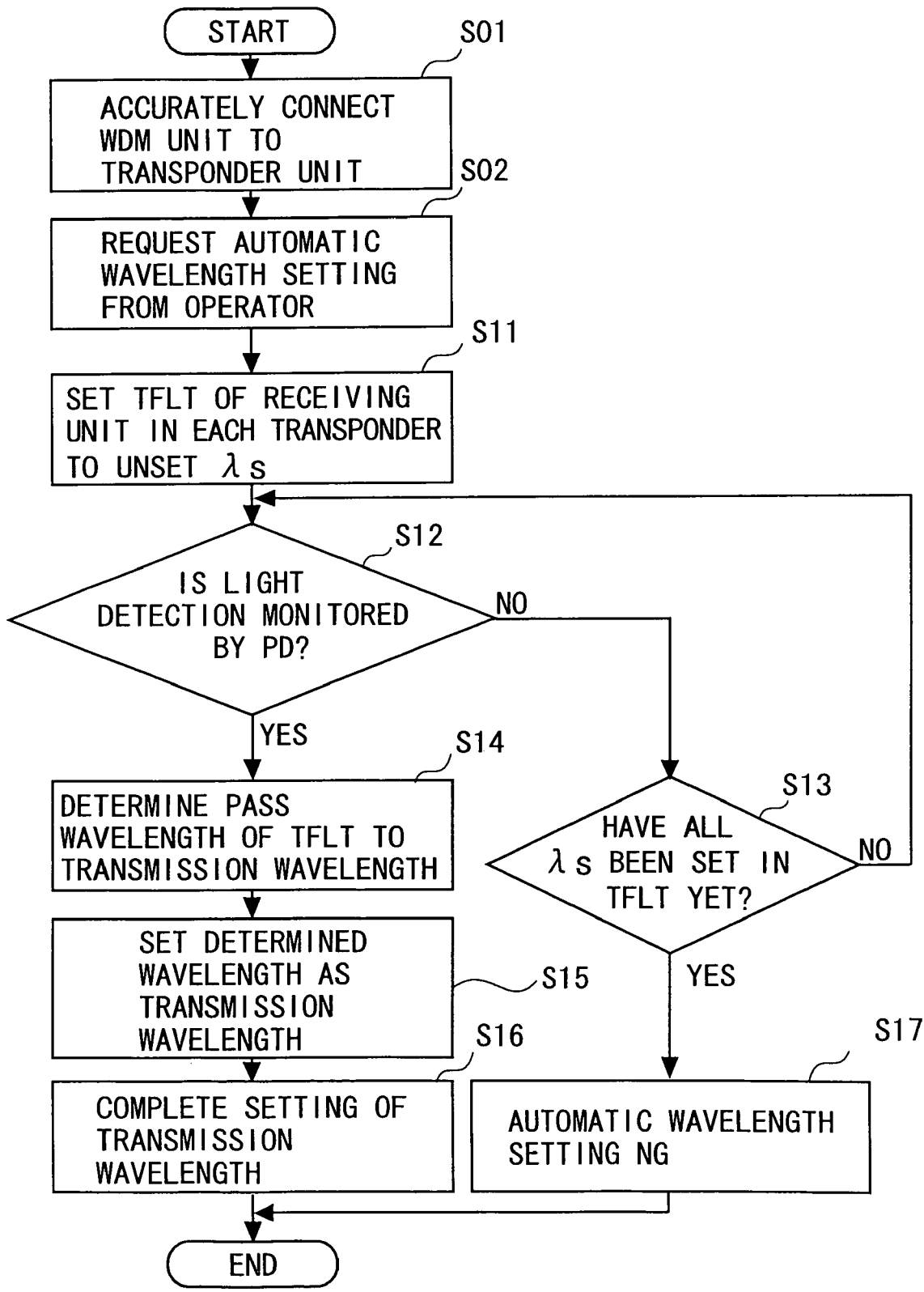
FIG. 8 is a diagram showing an automatic wavelength setting sequence according to the second embodiment.

FIG. 8 is a diagram showing an automatic wavelength setting sequence which is implemented by the WDM transmission apparatus 1A according to the second embodiment. An automatic wavelength setting process (automatic wavelength setting method) will be described with reference to FIG. 8. The implementing conditions of the second embodiment are the same as the implementing conditions of the first embodiment.

Referring to FIG. 8, the transponder 50A in an unused state is first connected to the WDM unit 20 (a given filter 21 in the WDM unit 20) by an optical fiber (Step S01). Subsequently, the operator inputs an automatic wavelength setting request command to the transponder control unit 30 (Step S02).

The processes in the steps S01 and 02 are identical with those in the first embodiment. In this example, it is assumed that the transponder 50A (#1) of FIG. 6 is to be connected (to be set in automatic wavelength).

When the transponder 50A (#1) is connected with the WDM unit 20, the receiving unit 55 is in a state of receiving a light (leak light) of a wavelength band centered on the wavelength λ1 from the corresponding filter 21. In this situation, a part of the leak light is inputted to the TFLT 60 by the CPL 54.

Upon notification of the request command, the wavelength control unit 62 sets the interval d (filter region) between the plane mirrors M1 and M2 within the TFLT 60 to a value corresponding to one of the wavelength grids (wavelengths λs) under the control of the actuator (Step S11). That is, the wavelength control unit 62 sets one of the wavelengths λs as the pass wavelength of the TFLT 60. In this situation, the wavelength control unit 62 monitors whether the set wavelength λs (light level) is detected by the PD 61, or not.

In the case where the light level is not detected by the PD 61 (NO in S12), the wavelength control unit 62 determines whether all of the wavelengths λs are set in the TFLT 60, or not (Step S13). In this situation, in the case where all of the wavelengths λs have been already set (YES in S13), the wavelength control unit 62 determines that the automatic wavelength setting is disabled (NG) (Step S17), and the automatic wavelength setting sequence is finished. On the contrary, in the case where all of the wavelengths λs are not set (NO in S13), the processing returns to Step S11, and the wavelength control unit 62 sets the different wavelengths λs in the TFLT 60.

In the case where the wavelength λ1 is set in the TFLT 60 in Step S11, since the incident light from the CPL 54 has the wavelength λ1, the pass light (transmission light) that has passed through the TFLT 60 and has the wavelength λ1 is detected by the PD 61. The wavelength control unit 62 is notified of the detection of the light level. Upon receiving the notification from the PD 61 (detecting the light level detection) (YES in S12), the wavelength control unit 62 determines the pass wavelength (the wavelength λs set in the TFLT 60) of the TFLT 60 in that situation as the transmission wavelength of the transponder 50A (#1) (Step S14). In this example, the wavelength λ1 is determined as the transmission wavelength.

Subsequently, the wavelength control unit 62 sets the determined transmission wavelength λ1 (Step S15). That is, the wavelength control unit 62 sets the transmission wavelength λ1 with respect to the transmission unit 53 (FIG. 6). When the setting of the transmission wavelength λ1 has been finished with respect to the transponder 50A (#1) in that way (Step S16), the automatic wavelength setting sequence has been finished.

Effects of the Second Embodiment

According to the second embodiment (WDM transmission apparatus 1A), the transponder 50A includes a detection unit (TFLT 60 and PD 61) for detecting the wavelength of the received light from the WDM unit 20, a determination unit (wavelength control unit 62) for determining the transmission wavelength to the WDM unit 20 in the transponder 50A on the basis of the detected wavelength, and a wavelength setting unit for conducting the setting control of the transmission wavelength (wavelength control unit 62). With the above structure, according to the second embodiment, the substantially same effects can be obtained as those of the first embodiment.

Third Embodiment

Subsequently, a description will be given of a wavelength division multiplexing apparatus (WDM transmission apparatus) according to a third embodiment of the present invention. The third embodiment includes the similarity with the second embodiment, and therefore differences therebetween will be mainly described, and the description of the similarity will be omitted.

FIG. 6 is a diagram showing a structural example showing a WDM transmission apparatus according to a second embodiment of the present invention. Referring to FIG. 6, a WDM transmission apparatus 1B is different from the WDM transmission apparatus 1A shown in FIG. 2 in the following points. That is, the WDM transmission apparatus 1B has a set wavelength information storage unit (storage unit) 31 that is produced on a memory device which can be accessed by the transponder control unit 30A. The storage unit 31 stores wavelength information indicative of the transmission wavelengths which have been already set in the transponder unit 10 therein.

In the case where an automatic wavelength setting request is inputted to the transponder control unit 30A, the transponder control unit 30A supplies the wavelength information (the transmission wavelength that has been already set) which is stored in the storage unit 31 to the wavelength control unit 62 of the transponder 50A to be set (connected). In the WDM transmission apparatus, there is no case in which the same wavelength is not used by the plural transponders. Accordingly, the wavelength control unit 62 removes all of the transmission wavelengths (wavelengths λs) that have been already set from the wavelengths λs which are set in the TFLT 60, and executes the wavelength setting process with the remaining wavelengths λs as the wavelengths to be set. For example, when the wavelengths λ2 to λn have been already set as the wavelengths λs, the wavelength control unit 62 determines only the wavelength λ1 as the wavelength to be set with respect to the TFLT 60, and executes the wavelength setting process.

Thus, all of wavelengths that can be used in the WDM transmission apparatus 1B are defined as the pass wavelength to be set with respect to the TFLT 60 in the second embodiment, whereas the wavelengths obtained by removing the wavelengths that has been already set from all of wavelengths are used as the pass wavelengths to be set in the third embodiment.

Figure 9:
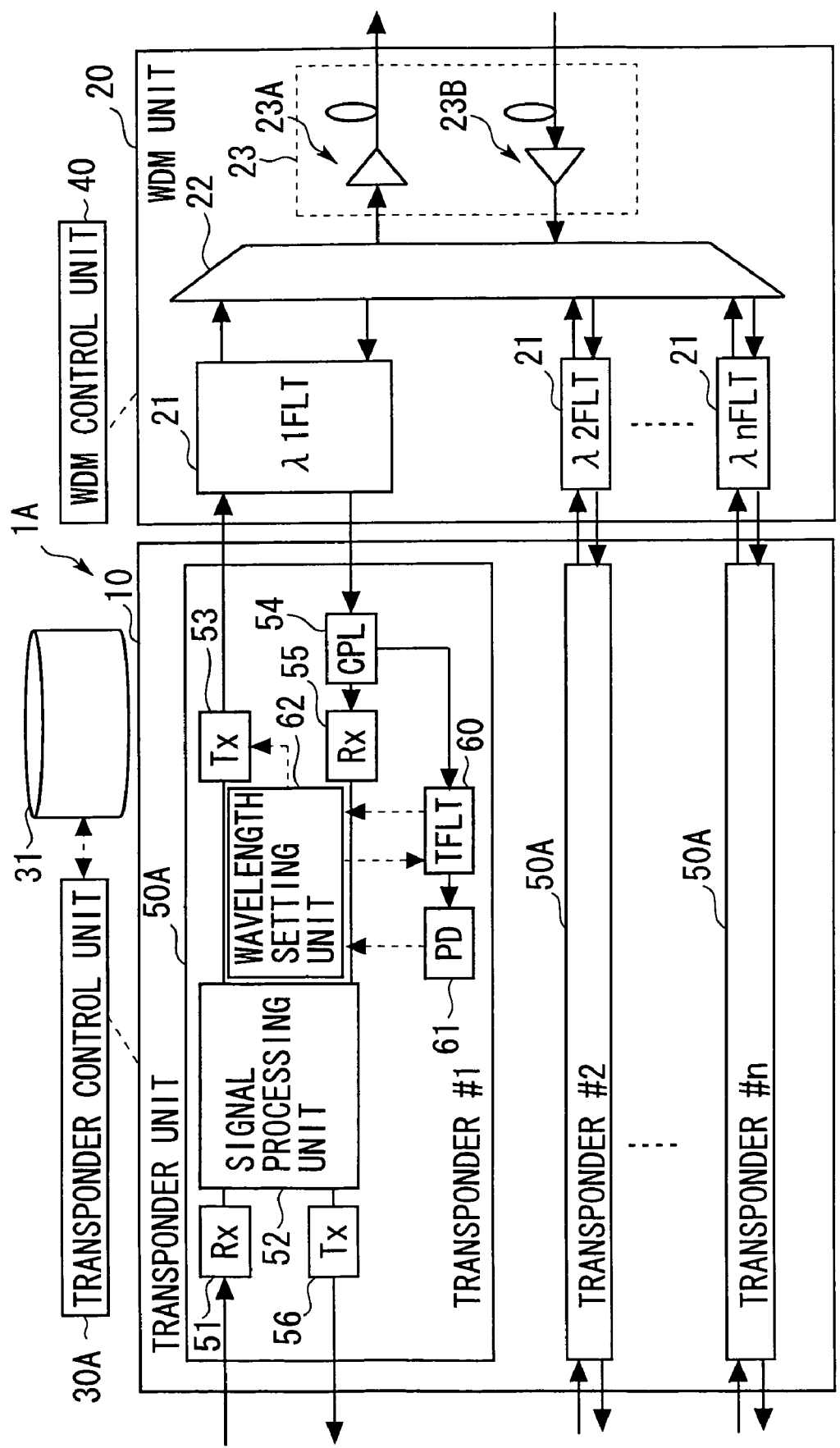
FIG. 9 is a diagram showing a structural example of a WDM transmission apparatus according to a third embodiment of the present invention.

Except for the above structure, the WDM transmission apparatus 1B has the same structure as that of the WDM transmission apparatus 1A. Referring to FIG. 9, the same structural elements as those in the WDM transmission apparatus 1A shown in FIG. 6 are denoted by identical reference symbols.

Figure 10:
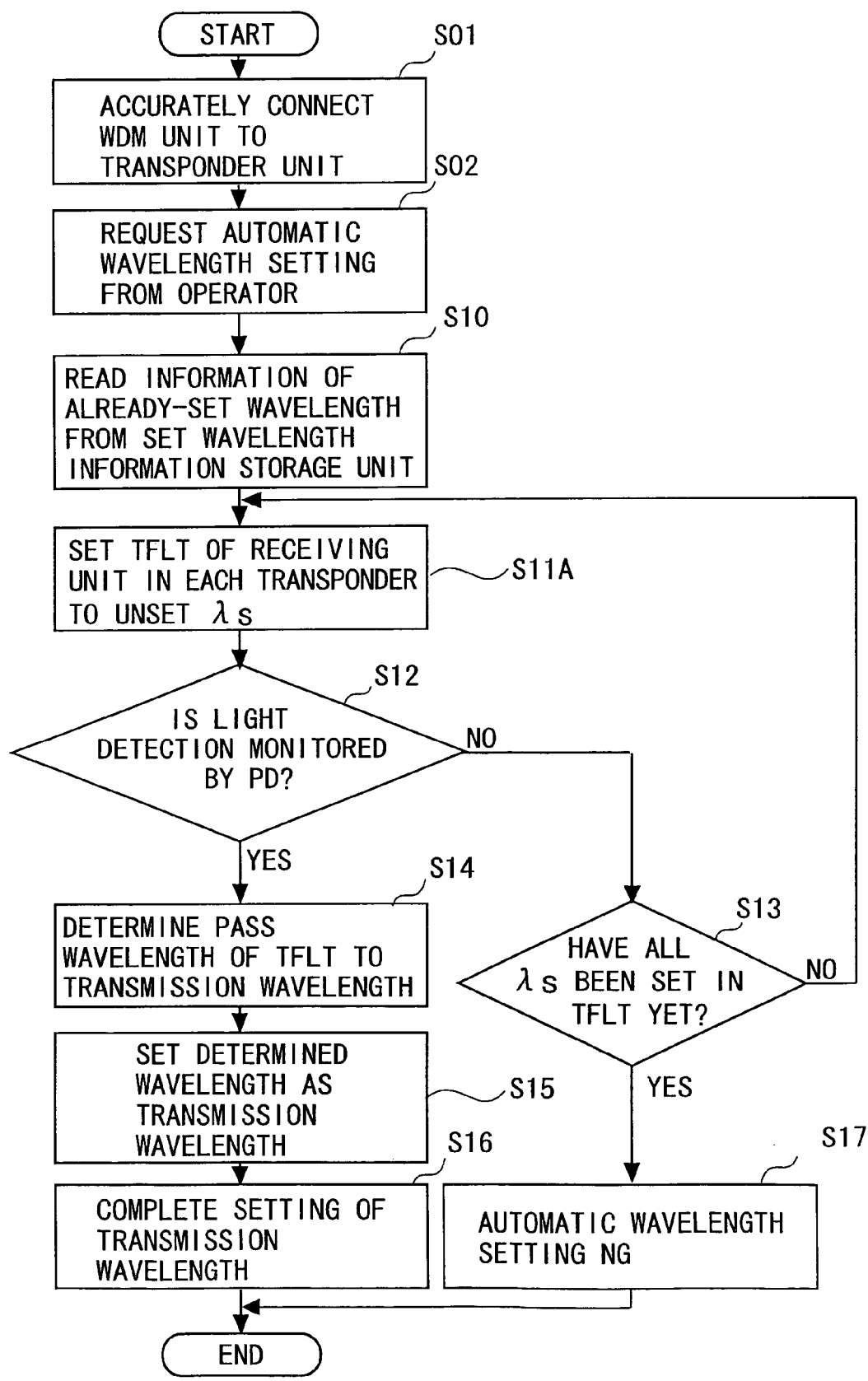
FIG. 10 is a diagram showing an automatic wavelength setting sequence according to the third embodiment.

FIG. 10 is a diagram showing an automatic wavelength setting sequence which is implemented in the WDM transmission apparatus 1B according to the third embodiment. An automatic wavelength setting process (automatic wavelength setting method) will be described with reference to FIG. 10. The implementing conditions of the third embodiment are identical with the implementing conditions of the second embodiment.

Referring to FIG. 10, Steps S01, S01, S12 to S17 are identical with those of the second embodiment except for Steps S10 and S11, and therefore their description will be omitted. In Step S10, the wavelength control unit 62 that has received an automatic wavelength setting request command reads the wavelength information (transmission wavelengths that have been already set) from the storage unit 31 through the transponder control unit 30A, and then removes the transmission wavelengths that have been already set from the pass wavelengths to be set in the TFLT 60. Subsequently, the wavelength control unit 62 sets one of the remaining wavelengths λs (pass wavelengths to be set) except for the transmission wavelengths that have been already set in the TFLT 60 in Step S11A.

Thereafter, the wavelengths whose light levels (pass lights) have been detected by the PD 60 are set as the transmission wavelengths (Steps S12 to S16). Upon completion of setting the transmission wavelengths, the wavelength control unit 62 notifies the transponder control unit 30A of the transmission wavelengths that have been set. The transponder control unit 30A stores (writes) the notified transmission wavelengths in the storage unit 31. The written transmission wavelengths are included in the wavelength information, and used in the automatic transmission wavelength setting of a subsequent transponder.

Effects of the Third Embodiment

According to the third embodiment (WDM transmission apparatus 1B), the WDM transmission apparatus 1B detects the wavelengths of the received lights from the WDM unit 20, and determines and sets the transmission wavelengths on the basis of the wavelengths of the received lights. As a result, the same effects as those of the second embodiment can be obtained.

In addition, in the third embodiment, there is provided a storage unit (storage unit 31) that stores information related to all of transmission wavelengths which have been already set in the transponder unit 10. In the wavelength detection of the received light by the detection unit (TFLT 60 and PD 61), all of transmission wavelengths which have been already set and stored in the storage unit are removed from the pass wavelengths to be set in the TFLT 60, and the wavelength detection process is executed with the remaining unused transmission wavelengths as the pass wavelengths to be set. As a result, since the number of wavelengths to be set with respect to the TFLT 60 is reduced, it is possible to reduce a period of time required for automatic transmission wavelength setting.

Modified Example

The third embodiment is so structured as to store the transmission wavelengths that have been already set in the storage unit 31. The structure may be replaced by a structure where a wavelength list in which the transmission wavelengths that have been already set are removed from all of wavelengths λs is stored in the storage unit 31, and the wavelength control unit 62 uses the wavelengths included in the wavelength list in the storage unit 31 as the pass wavelengths to be set, and executes the wavelength setting with respect to the transmission unit 53.

Similarly, the first embodiment can be so structured that the transmission wavelengths that have been already set in the transponder unit 10 is held by the storage unit (storage unit 31), and the grating 573 (FIG. 3) is not set at the rotation angles corresponding to the transmission wavelengths that have been already set.

Others

The disclosures of Japanese patent application No. JP2005-286660 filed on Sep. 30, 2005 including the specification, drawings and abstract are incorporated herein by reference.

What is claimed is:

1. A wavelength division multiplexing apparatus, comprising:
a transponder unit; and
a wavelength division multiplexing unit to be connected with the transponder unit,
wherein the wavelength division multiplexing unit multiplexes in wavelength a plurality of lights having different wavelengths which are received from the transponder unit to send the wavelength-multiplexed lights, when receiving wavelength-multiplexed lights, divides the received wavelength-multiplexed lights into lights having different wavelengths, to transmit the divided lights to the transponder unit,
wherein the transponder unit includes a plurality of transponders that are prepared in each wavelength of the plurality of lights which are multiplexed and divided by the wavelength division multiplexing unit, and each transponder transmits and receives one of the plurality of lights with respect to the wavelength division multiplexing unit, and
wherein at least one of the plurality of transponders comprises:
a detection unit to detect the wavelength of the received light having one of the different wavelengths which is received from the wavelength division multiplexing unit when the one transponder is connected to the wavelength division multiplexing unit;
a determination unit to determine a transmission wavelength which is a wavelength of the light transmitted to the wavelength division multiplexing unit as the same wavelength with the wavelength of the received light which is detected by the detection unit; and
a setting control unit to perform setting to convert the wavelength of the light to be transmitted to the wavelength division multiplexing unit into the transmission wavelength for transmission.

2. The wavelength division multiplexing apparatus according to claim 1, wherein the determination unit determines to which of a plurality of wavelength grids used in the wavelength division multiplexing apparatus the wavelength of the received light detected by the detection unit belong, and determines a center wavelength of the wavelength grid to which the wavelength of the detected light belongs as the transmission wavelength.

3. The wavelength division multiplexing apparatus according to claim 1, wherein the detection unit comprises:
a tunable filter to be able to change the pass wavelength and inputs the received light from the wavelength division multiplexing unit;
a photodetector to detect the light that passes through the tunable filter; and
a control unit to change the pass wavelength according to a detection status of the photodetector, and
wherein the pass wavelength when the received light that passes through the tunable filter is detected by the photodetector is detected as the wavelength of the received light.

4. The wavelength division multiplexing apparatus according to claim 3, wherein the plural different wavelengths that can be used in the wavelength division multiplexing apparatus are defined as pass wavelengths to be set in the tunable filter, and
wherein the pass wavelength of the tunable filter switches over to one of the pass wavelengths to be set according to a detection status of the photodetector.

5. The wavelength division multiplexing apparatus according to claim 1, wherein the transponder unit comprises a plurality of transponders each having the detection unit, the determination unit, and the setting control unit, and the plurality of transponders execute independently the detection of the received light, the determination of the transmission wavelength, and the setting control of the transmission wavelength according to one automatic wavelength setting request.

6. The wavelength division multiplexing apparatus, comprising:
    a transponder unit; and
    a wavelength division multiplexing unit to be connected with the transponder unit;
    wherein the wavelength division multiplexing unit multiplexes in wavelength a plurality of lights having different wavelengths which are received from the transponder unit to send the wavelength-multiplexed lights, when receiving wavelength-multiplexed lights, divides the received wavelength-multiplexed lights into lights having different wavelengths, to transmit the divided lights to the transponder unit,
    wherein the transponder unit includes a plurality of transponders that are prepared in each wavelength of the plurality of lights which are multiplexed and divided by the wavelength division multiplexing unit, and each transponder transmits and receives one of the plurality of lights with respect to the wavelength division multiplexing unit, and
    wherein at least one of the plurality of transponders comprises:
    a detection unit to detect the wavelength of the received light having one of the different wavelengths which is received from the wavelength division multiplexing unit when the one transponder is connected to the wavelength division multiplexing unit;
    a determination unit to determine a transmission wavelength which is a wavelength of the light transmitted to the wavelength division multiplexing unit on the basis of the wavelength of the received light which is detected by the detection unit; and
    a setting control unit to perform setting to convert the wavelength of the light to be transmitted to the wavelength division multiplexing unit into the transmission wavelength for transmission,
    wherein the detection unit comprises:
    a tunable filter to be able to change the pass wavelength and inputs the received light from the wavelength division multiplexing unit;
    a photodetector to detect the light that passes through the tunable filter; and
    a control unit to change the pass wavelength according to a detection status of the photodetector, and
    wherein the pass wavelength when the received light that passes through the tunable filter is detected by the photodetector is detected as the wavelength of the received light,
    wherein the plural different wavelengths that can be used in the wavelength division multiplexing apparatus are defined as sass wavelengths to be set in the tunable filter, and
    wherein the sass wavelength of the tunable filter switches over to one of the pass wavelengths to be set according to a detection status of the photodetector,
    a storage unit to store information where the wavelengths that have been already used in the wavelength division multiplexing apparatus can be identified,
    wherein the wavelength that is in use is removed from the pass wavelengths to be set.

7. An automatic transmission wavelength setting method for a wavelength division multiplexing apparatus including: a transponder unit and a wavelength division multiplexing unit that is connected with the transponder unit, the wavelength division multiplexing unit multiplexing a plurality of lights having different wavelengths which are received from the transponder unit in wavelength to send the wavelength-multiplexed lights, when receiving the wavelength-multiplexed lights, dividing the wavelength-multiplexed lights into lights having different wavelengths, to transmit the divided lights to the transponder unit,
    the transponder unit to include a plurality of transponders that are prepared in each wavelength multiplexed and divided by the wavelength division multiplexing unit, and each transponder to transmit and receive one of the plurality of lights having different wavelengths with respect to the wavelength division multiplexing unit,
    the method causing at least one of the plurality of transponders to perform:
    detecting the wavelength of the received light having one of the different wavelengths which is received from the wavelength division multiplexing unit when the one transponder is connected to the wavelength division multiplexing unit;
    determining a transmission wavelength which is a wavelength of the light transmitted to the wavelength division multiplexing unit as the same wavelength with the detected wavelength of the received light; and
    performing setting to convert the wavelength of the light to be transmitted to the wavelength division multiplexing unit into the transmission wavelength for transmission.

8. A transponder connected to a wavelength division multiplexing unit included in a wavelength division multiplexing apparatus, for transmitting one of a plurality of lights different in wavelength which are multiplexed in wavelength by the wavelength division multiplexing unit to the wavelength division multiplexing apparatus and receiving a light having the same wavelength as the wavelength which is transmitted to the wavelength division multiplexing apparatus from the wavelength division multiplexing unit, the transponder comprising:
    a detection unit to detect the wavelength of a received light having one of the different wavelengths which is received from the wavelength division multiplexing unit when the detection unit is connected to the wavelength division multiplexing unit;
    a determination unit to determine a transmission wavelength which is a wavelength of the light transmitted to the wavelength division multiplexing unit as the same wavelength with the wavelength of the received light which is detected by the detection unit; and
    a setting control unit to set to convert the wavelength of the light to be transmitted to the wavelength division multiplexing unit into the transmission wavelength, and transmit the converted transmission wavelength.

* * * * *

UNITED STATES PATENT AND TRADEMARK OFFICE
CERTIFICATE OF CORRECTION

| | | |
|---|---|---|
| PATENT NO. | : 7,720,384 B2 | Page 1 of 1 |
| APPLICATION NO. | : 11/320638 | |
| DATED | : May 18, 2010 | |
| INVENTOR(S) | : Kazuhiro Kunimatsu et al. | |

It is certified that error appears in the above-identified patent and that said Letters Patent is hereby corrected as shown below:

Claim 6 (Column 17, line 51)
the term "defined as sass wavelengths ..." should be -- pass wavelengths ...--

Claim 6 (Column 17, line 53)
the term "wherein the sass wavelength ..." should be -- wherein the pass wavelength ...--

Signed and Sealed this
Fifteenth Day of March, 2011

David J. Kappos
*Director of the United States Patent and Trademark Office*